(12) United States Patent
Hoffmann

(10) Patent No.: US 10,711,763 B2
(45) Date of Patent: Jul. 14, 2020

(54) WIND-TURBINE ROTOR BLADE AND METHOD FOR PRODUCING A WIND-TURBINE ROTOR BLADE

(71) Applicant: Wobben Properties GmbH, Aurich (DE)

(72) Inventor: Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 151 days.

(21) Appl. No.: 15/766,661

(22) PCT Filed: Oct. 14, 2016

(86) PCT No.: PCT/EP2016/074654
§ 371 (c)(1),
(2) Date: Apr. 6, 2018

(87) PCT Pub. No.: WO2017/064226
PCT Pub. Date: Apr. 20, 2017

(65) Prior Publication Data
US 2018/0298877 A1   Oct. 18, 2018

(30) Foreign Application Priority Data

Oct. 14, 2015   (DE) ........................ 10 2015 117 437

(51) Int. Cl.
*F03D 1/06* (2006.01)
*B29D 99/00* (2010.01)

(52) U.S. Cl.
CPC ......... *F03D 1/0675* (2013.01); *F03D 1/0658* (2013.01); *B29D 99/0025* (2013.01);
(Continued)

(58) Field of Classification Search
CPC .... F03D 1/0675; F03D 1/0658; F03D 1/0641; B32B 5/24; B29C 53/822; Y02E 10/721
(Continued)

(56) References Cited

U.S. PATENT DOCUMENTS 4,242,160 A * 12/1980 Pinter ..................... B29C 53/82
138/156
4,260,332 A * 4/1981 Weingart ................ B64C 11/20
416/218
(Continued)

FOREIGN PATENT DOCUMENTS

DE    1045810 B    12/1958
DE    2921152 C2    4/1982
(Continued)

*Primary Examiner* — Eldon T Brockman
*Assistant Examiner* — Wesley Le Fisher
(74) *Attorney, Agent, or Firm* — Seed Intellectual Property Law Group LLP

(57) ABSTRACT

A wind-turbine rotor blade having a rotor blade portion which comprises an inner rotor blade portion with a first end having a plurality of fastening units for fastening to a hub of a wind turbine and a second end having a flange for fastening further portions of the wind-turbine rotor blade, wherein the inner rotor blade portion is produced from polymer concrete, wherein the rotor blade portion has a plurality of resin-impregnated fiber-composite laid scrims or rovings which are wound around the inner rotor blade portion.

7 Claims, 3 Drawing Sheets

(52) U.S. Cl.
CPC ....... *F05B 2230/50* (2013.01); *F05B 2230/60* (2013.01); *F05B 2240/30* (2013.01); *F05B 2240/301* (2013.01); *F05B 2250/611* (2013.01); *F05B 2280/6013* (2013.01); *Y02E 10/721* (2013.01); *Y02P 70/523* (2015.11)

(58) Field of Classification Search
USPC .................................. 416/226, 230; 156/172
See application file for complete search history.

(56) References Cited

U.S. PATENT DOCUMENTS

| | | | |
|---|---|---|---|
| 4,273,601 A * | 6/1981 | Weingart | B29C 53/582 |
| | | | 156/184 |
| 4,381,960 A * | 5/1983 | Pinter | B29C 53/585 |
| | | | 156/175 |
| 4,389,162 A | 6/1983 | Doellinger et al. | |
| 4,494,910 A * | 1/1985 | Hahn | B64C 27/473 |
| | | | 156/156 |
| 7,530,168 B2 * | 5/2009 | Sorensen | B29C 70/86 |
| | | | 29/889.21 |
| 8,192,170 B2 | 6/2012 | Rohden | |
| 2009/0313913 A1 * | 12/2009 | Malheiro De Aragao | |
| | | | E04H 12/12 |
| | | | 52/40 |
| 2011/0020129 A1 | 1/2011 | Petri Larrea et al. | |
| 2011/0206529 A1 * | 8/2011 | Bell | B29C 65/48 |
| | | | 416/226 |
| 2011/0211971 A1 | 9/2011 | Bendel et al. | |
| 2011/0262732 A1 * | 10/2011 | Ogden | C04B 20/1033 |
| | | | 428/294.7 |
| 2012/0045343 A1 * | 2/2012 | Hancock | B29C 70/30 |
| | | | 416/226 |
| 2012/0093656 A1 | 4/2012 | Esaki et al. | |
| 2013/0106245 A1 | 5/2013 | Giebe et al. | |
| 2014/0119937 A1 * | 5/2014 | Fang | B29C 70/56 |
| | | | 416/233 |
| 2014/0361547 A1 * | 12/2014 | Alti Barbon | F03D 1/0658 |
| | | | 290/55 |
| 2015/0226180 A1 * | 8/2015 | Grove-Nielsen | F03D 1/0658 |
| | | | 416/217 |
| 2015/0266250 A1 * | 9/2015 | Hoffmann | B29C 53/56 |
| | | | 415/200 |

FOREIGN PATENT DOCUMENTS

| | | | | |
|---|---|---|---|---|
| DE | 102010002432 A1 | | 9/2011 | |
| DE | 102010019666 A1 | | 11/2011 | |
| EP | 2108819 A2 | | 10/2009 | |
| JP | H07-117139 A | | 5/1995 | |
| JP | 2001-165033 A | | 6/2001 | |
| JP | 2009-536704 A | | 10/2009 | |
| WO | 2014072120 A1 | | 5/2014 | |
| WO | WO-2014072120 A1 * | | 5/2014 | ............. B29C 53/56 |

* cited by examiner

WIND-TURBINE ROTOR BLADE AND METHOD FOR PRODUCING A WIND-TURBINE ROTOR BLADE

BACKGROUND

Technical Field

The present invention relates to a wind-turbine rotor blade and to a method for producing a wind-turbine rotor blade.

Description of the Related Art

Rotor blades of wind-turbines are typically produced from fiber-composite materials such as GRPs or CRPs, for example. Here, for example, two half-shells can be produced and then adhesively bonded to one another or fastened to one another in some other way. The half-shells can be produced, for example, in a vacuum injection-molding process or infusion process.

In principle, in the field of the rotor blade technology of wind turbines, particular stability requirements are placed on the hub-side end pieces of rotor blades since these are responsible for the introduction of force from the rotor blade into a hub of the wind turbine. Particularly high static and dynamic loads can occur here.

WO 2014/072120 A1 shows a method for producing semifinished products for wind-turbine rotor blades. The semifinished product is produced by winding a resin-impregnated laid scrim.

The following documents have been mentioned as prior art by the German Patent and Trademark Office in the priority-establishing German patent application: DE 10 2010 019 666 A1, DE 29 21 152 C2, WO 2014/072120 A1, DE 10 2010 002 432 A1 and DE 1 045 810 A.

BRIEF SUMMARY

Provided is an improved wind-turbine rotor blade and also an improved method for producing a wind-turbine rotor blade.

Provided is a wind-turbine rotor blade having a rotor blade portion which comprises a rotor blade inner portion with a first end having a plurality of fastening units for fastening to a hub of a wind turbine and a second end having a flange for fastening further portions of the wind-turbine rotor blade. The inner blade portion is produced from polymer concrete.

According to a further aspect of the present invention, the rotor blade portion has a plurality of resin-impregnated fiber-composite laid scrims or rovings which are wound around the inner rotor blade portion.

According to a further aspect of the present invention, the inner rotor blade portion has at least one spar cap which is wound in by means of the fiber-composite laid scrims.

According to a further aspect of the present invention, the inner rotor blade portion is designed to be hollow on the inside and has a corrugated inner contour.

Provided is a method for producing a wind-turbine rotor blade. A rotor blade portion is produced from polymer concrete. This rotor blade portion produced from polymer concrete is used as a winding mandrel and resin-impregnated fiber-composite laid scrims are wound around the winding mandrel.

The invention is concerned with the idea of producing at least parts of the rotor blade by winding. A winding mandrel required for this purpose can be produced from polymer concrete and the winding mandrel can constitute part of the finished wind-turbine rotor blade. The winding mandrel thus remains in the wind-turbine rotor blade. There is thus no need for a hitherto required demolding of a hitherto used separable steel mandrel. Furthermore, the weight of the rotor blade can be reduced. The use of polymer concrete improves the recyclability of the rotor blade.

The winding mandrel can be cast or spun from polymer concrete. It is optionally possible here for a flange with prefabricated threaded inserts or for complete metal flanges to be concomitantly cast in or spun in. Subsequent machining can thus be completely or partly dispensed with. In addition thereto, further threaded connection inserts, such as, for example, for rear edge segments, can be concomitantly cast in.

The use of a polymer concrete component as a winding mandrel can lead to a reduction in the costs and in the production times.

Further refinements of the invention form the subject matter of the subclaims.

BRIEF DESCRIPTION OF THE SEVERAL VIEWS OF THE DRAWINGS

Advantage and exemplary embodiments of the invention will be explained in more detail below with reference to the drawing, in which.

DETAILED DESCRIPTION

Figure 1:
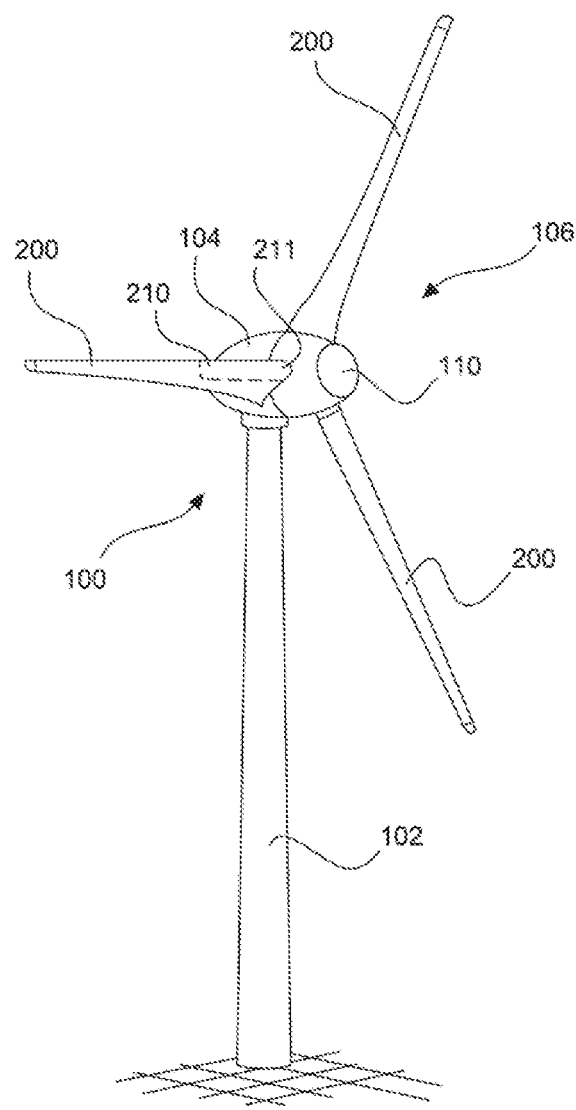
FIG. 1 shows a schematic illustration of a wind turbine according to the invention.

FIG. 1 shows a wind turbine 100 having a tower 102 and a nacelle 104. A rotor 106 with three rotor blades 200 and a spinner 110 is arranged on the nacelle 104. During operation, the rotor 106 is set into a rotational movement by the wind and thereby drives a generator in the nacelle 104. The rotor blade 200 according to the invention has an inner rotor blade portion 210.

Figure 2:
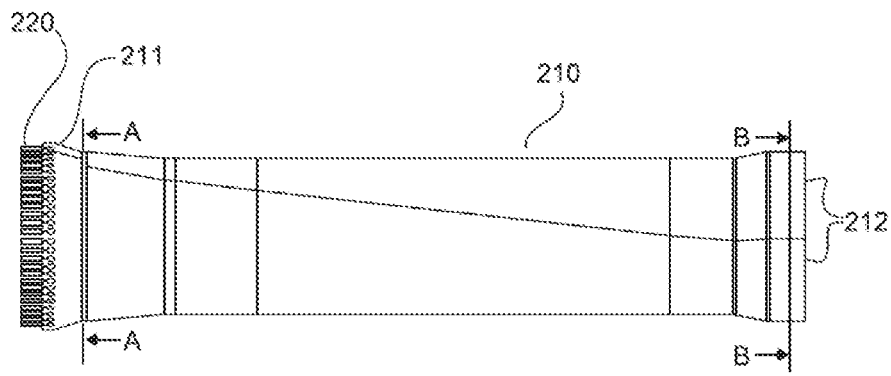
FIG. 2 shows a schematic illustration of a wind-turbine rotor blade portion.

FIG. 2 shows a schematic illustration of a wind-turbine rotor blade portion. In FIG. 2 there is shown an inner rotor blade portion 210 which has a first end 211 optionally equipped with a plurality of threaded bolts 220. The threaded bolts 220 make it possible for the rotor blade 200 to be fastened to a hub of the wind turbine. The rotor blade portion 210 has a second end 212 with a flange to which further portions of the rotor blade can be fastened.

Figure 3:
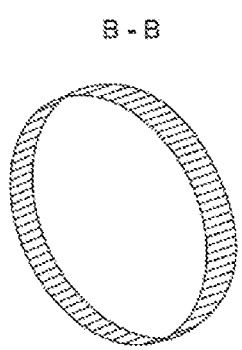
FIG. 3 shows a cross section of the rotor blade portion from FIG. 2.

FIG. 3 shows a cross section of the rotor blade portion from FIG. 2. The cross section of the inner rotor blade portion is elliptical or round.

Figure 4:
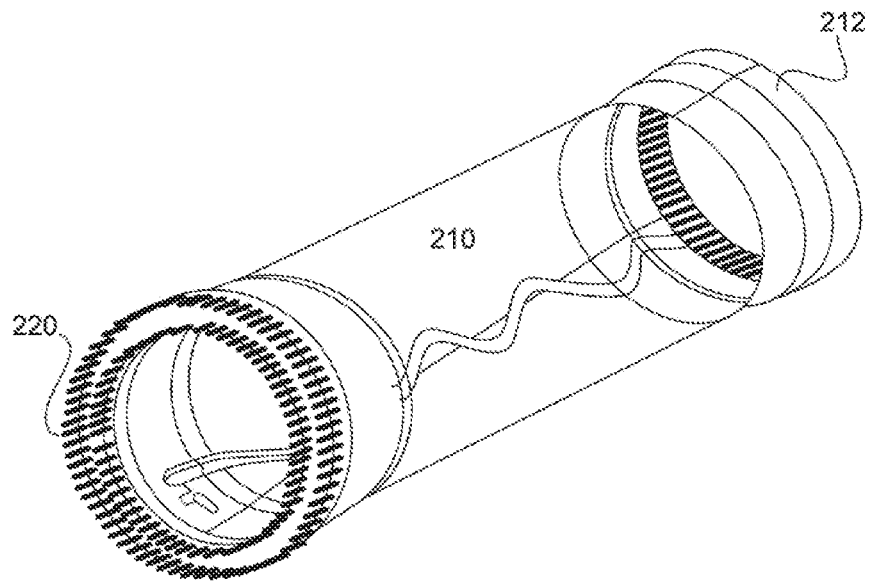
FIG. 4 shows a schematic and perspective illustration of the rotor blade portion from FIG. 2.

FIG. 4 shows a schematic and perspective illustration of the rotor blade portion from FIG. 2.

The inner rotor blade portion 210 is produced from polymer concrete. The main constituent part of the polymer concrete can constitute a mixture of dried sand of different grain size and/or finely ground or pulverulent quartz and a binding synthetic resin. It is furthermore possible for relatively large stones, for example based on granite, also to be provided in the polymer concrete. The strength properties of the polymer concrete can be selected by admixing short fibers of glass or carbon. Here, good packing and compaction of the fillers should be achieved.

According to one aspect of the present invention, the polymer concrete can be produced from 50% coarse sand (equivalent diameter 0.63 to 2 mm), 15% medium sand (equivalent diameter 0.2-0.63 mm), 10% quartz powder (equivalent diameter 0.063 to 0.2 mm), 5% short fiber (glass fiber), fiber length about 20 to 30 mm (filament diameter including the size, about 19 µm) and 20% (resin/curing agent mixture) synthetic resin, for example an epoxy resin-based two-component resin system or thermoplastic resin systems or curing agents. Other percentage distributions are also possible.

An inner rotor blade portion 210 can be produced from these constituent parts. This inner rotor blade portion can be used as a winding core or winding mandrel during the production of a rotor blade of a wind turbine. This winding core or winding mandrel can perform a number of structural tasks (such as, for example, an anti-buckling support) during the operation of the rotor blade. The winding mandrel thus remains in the rotor blade of the wind turbine.

According to one aspect of the present invention, flanges 211, 212 can be provided at the ends of the inner rotor portion 210. These flanges can be cast in the polymer concrete.

To produce a rotor blade of a wind turbine according to the invention, an inner rotor blade portion of polymer concrete is thus used as a winding mandrel. This occurs by casting or spinning a polymer concrete, and the thus produced portion is used as a winding mandrel and fiber-composite laid scrims or rovings can be impregnated in resin and then wound around the winding mandrel in order to produce a semifinished product which becomes part of a rotor blade.

It is possible, for example, for flanges and rotor blade connections also to be directly concomitantly wound in.

Polymer concrete is advantageous in terms of the high chemical resistance, the sealing tightness, the aging resistance, the damping properties and its dynamic strength.

Mechanical finishing is reduced by using an inner rotor blade portion as a winding core composed of polymer concrete with already incorporated flanges. Furthermore, fillers which are more favorable can be allowed. Moreover, a weight reduction is also possible through a more efficient material use.

The inner rotor blade portion can be produced from polymer concrete. This can be cast under vibration or spun (spun concrete). The rotor blade portion remains in the rotor blade after the production of the rotor blade and can optionally serve as an anti-buckling support. Furthermore, the rotor blade portion can be used as a winding mandrel.

According to one aspect of the present invention, the inner surfaces can be designed to be smooth, have ribs or be designed to be corrugated over the circumference and in the longitudinal direction.

According to one aspect of the present invention, the rotor bade portion has prefabricated flanges consisting of steel, GRP or CRP, steel inserts or metallic threaded sleeves. Particularly during the production of the inner rotor blade portion, these can be concomitantly cast in or concomitantly spun in.

According to a further aspect of the present invention, it is possible for main or auxiliary spar caps (suction side, pressure side, front side and end edge) to be concomitantly wound in on the inside or outside. For example, depressions can be concomitantly cast in or provided in the contour of the inner rotor blade portion. The provision of the depressions in the outer contour of the inner rotor blade portion allows components to be inserted or applied by adhesive bonding such that a smooth outer contour is present for winding reinforcing material.

Figure 5:
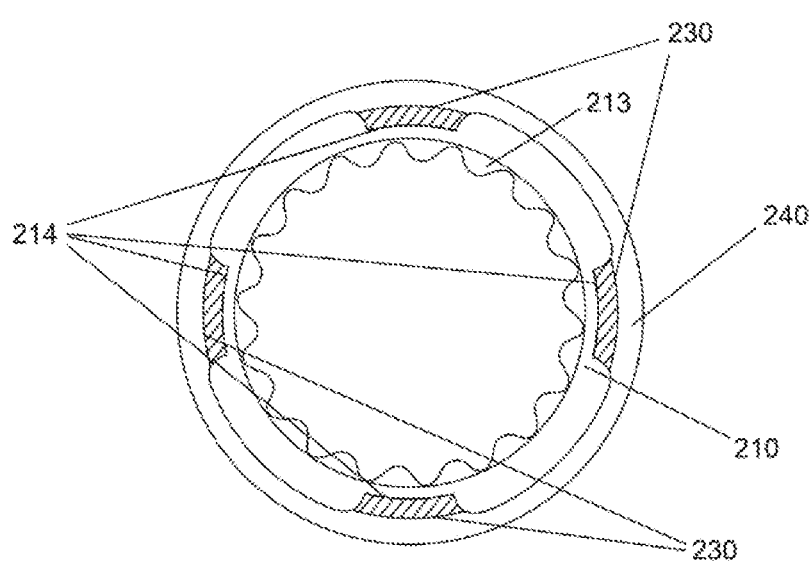
FIG. 5 shows a schematic cross section of an inner rotor blade portion according to the invention.

FIG. 5 shows a schematic cross section of an inner rotor blade portion. The inner rotor blade portion 210 is composed of polymer and designed, in particular, to be hollow and can have on its inside, in cross section, a corrugated inner contour 213. The polymer concrete of the inner rotor blade portion 210 can optionally have depressions 214 into which spar caps 230 can be placed. Optionally, the inner rotor blade portion and the spar caps 230 can further be enwrapped by a fiber-composite laid scrim 240 which is resin-impregnated.

The invention claimed is:

1. A wind-turbine rotor blade comprising:
    an inner rotor blade portion having a first end and a second end, wherein a plurality of fastening units are coupled to the first end for fastening the wind-turbine rotor blade to a hub of a wind turbine, wherein the second end has a flange coupled to further portions of the wind-turbine rotor blade, wherein the inner rotor blade portion is produced from polymer concrete; and
    a plurality of resin-impregnated fiber-composite laid scrims or rovings wound around the inner rotor blade portion, wherein the inner rotor blade portion serves as a winding mandrel,
    wherein the inner rotor blade portion includes at least one spar cap, wherein the fiber-composite laid scrims or rovings are wound around the at least one spar cap.

2. The wind-turbine rotor blade as claimed in claim 1, wherein the inner rotor blade portion has a hollow interior portion, wherein the hollow interior portion has an inner surface that has a corrugated inner contour.

3. The wind-turbine rotor blade as claimed in claim 1, wherein the wound fiber-composite laid scrims are wound around the winding mandrel.

4. A wind-turbine comprising:
    the wind-turbine rotor blade as claimed in claim 1.

5. A method for producing at least a part of a wind-turbine rotor blade, the method comprising:
    producing an inner rotor blade portion by casting or spinning polymer concrete,
    using the inner rotor blade portion as a winding mandrel by winding resin-impregnated fiber-composite laid scrims or rovings around the inner rotor blade portion; and
    coupling at least one spar cap to the inner rotor blade portion prior to winding the resin-impregnated fiber-composite laid scrims or rovings around the inner rotor blade portion.

6. The method as claimed in claim 5, wherein producing the inner rotor blade portion comprises casting or spinning polymer concrete to produce the inner rotor blade portion to include a hollow interior portion.

7. The method as claimed in claim 6, wherein the hollow interior portion includes a corrugated inner contour.

* * * * *